United States Patent [19]

Leung et al.

[11] Patent Number: 5,225,283
[45] Date of Patent: Jul. 6, 1993

[54] COATING FOR PROTECTING A CARBON-CARBON COMPOSITE FROM OXIDATIVE DEGRADATION

[75] Inventors: Roger Y. Leung, Schaumburg; Bryan A. Weyneth, Oak Forest, both of Ill.

[73] Assignee: Allied-Signal Inc., Morris Township, Morris County, N.J.

[21] Appl. No.: 42,090

[22] Filed: Apr. 24, 1987

[51] Int. Cl.⁵ .................................... B32B 9/00
[52] U.S. Cl. ............................. 428/408; 428/426; 428/446; 428/697; 428/698; 65/32.1; 65/32.4; 65/32.5; 65/60.1; 65/60.5; 65/60.8; 427/189; 427/193; 427/226; 427/227; 427/387; 427/419.6; 501/11; 501/32; 501/54; 501/55; 501/87; 501/95
[58] Field of Search .............. 428/408, 426, 446, 454, 428/697, 698, 447; 427/189, 193, 201, 226, 227, 387, 419.6; 501/11, 32, 54, 55, 87, 95; 65/32, 60.1, 60.5, 60.52, 60.6, 60.8

[56] References Cited

U.S. PATENT DOCUMENTS

| | | | |
|---|---|---|---|
| Re. 32,107 | 4/1986 | January | 501/32 X |
| 2,482,933 | 9/1949 | Queneau | 428/426 X |
| 2,859,139 | 11/1958 | Ramadanoff | 427/226 X |
| 3,378,431 | 4/1968 | Smith, Jr. et al. | 501/32 |
| 3,477,868 | 11/1969 | Grundschober et al. | 427/226 |
| 4,321,298 | 3/1982 | Shaffer et al. | 428/242 |
| 4,460,639 | 7/1984 | Chi et al. | 427/387 X |
| 4,559,270 | 12/1985 | Sara | 428/408 |
| 4,618,591 | 10/1986 | Okamura et al. | 501/90 |

Primary Examiner—Donald P. Walsh
Assistant Examiner—Chrisman D. Carroll
Attorney, Agent, or Firm—Frank S. Molinaro; Harold N. Wells; Gerhard H. Fuchs

[57] ABSTRACT

A process for forming a high temperature oxidation resistant coating on a carbon-carbon composite is disclosed and claimed. The process comprises applying a cyclosiloxane monomer blend containing a filler such as silicon carbide to a carbon-carbon composite, polymerizing and pyrolyzing said blend to form a filled black glass protective coating on the carbon-carbon composite.

28 Claims, No Drawings

COATING FOR PROTECTING A CARBON-CARBON COMPOSITE FROM OXIDATIVE DEGRADATION

BACKGROUND OF THE INVENTION

Carbon-carbon composites are useful materials for high temperature applications. Characteristics such as high heat of ablation, thermal shock resistance, strength improvement at elevated temperatures, and chemical inertness result in a material that is capable of high performance in extreme thermal environments. Carbon-carbon composites consist of a fibrous carbon substrate in a carbonaceous matrix wherein each constituent may range from carbon to graphite. The temperature capabilities of these composites extend to over 6000° F. and the strength of the composites is about twenty times that of graphite, yet they are lighter and have a density of less than 1.8 grams per cubic centimeter. Since carbon-carbon composites oxidize in air at temperatures above 400° C., such composites require a coating to protect them from oxidation.

A typical carbon-carbon composite is formed from graphite cloth, impregnated with a carbonaceous polymer or resin, which is laid in a form or mold and cured. After trimming, the material is pyrolyzed to convert the polymer or resin to graphite. The soft composite is reimpregnated and repyrolyzed as many times as is necessary to form the composite of correct strength and density. The composite can be used as is or can be coated to protect it from severe conditions of use.

One coating technique disclosed in U.S. Pat. No. 4,321,298 involves coating a fibrous carbon material containing boron with a flexible thermosetting resin which contains a refractory metal such as tungsten or molybdenum. The advantage to this technique is that a metal boride is formed at high temperatures which is more stable than boron carbide. However, no mention is made to applying this technique to carbon-carbon composites without boron. In fact the invention is aimed at preventing the detrimental interaction of boron and the carbon fibers.

Additionally, U.S. Pat. No. 4,618,591 teaches a method of preparing a silicon carbide-carbon composite. The process involves using a polycarbosilane to impregnate a base material. Patentee shows no appreciation regarding the high temperature resistance to oxidation of these composites. Since the composite contains free carbon it would not be expected to be very stable at high temperatures.

In contrast to this prior art, the instant invention discloses a method of forming a high temperature oxidation resistant coating comprising a black glass on a carbon-carbon composite. This extends the usable temperature range for these carbon-carbon composites.

BRIEF DESCRIPTION OF THE INVENTION

As hereinbefore described, carbon-carbon composites are light, tough, and strong and are an ideal structural material for demanding performance. However, carbon-carbon composites cannot be used in air at temperatures above about 400° C. since the carbon of the composite will oxidize.

One object of this invention is to form a coating on the carbon-carbon composite which will protect the composite from high temperature oxidation.

A further object of this invention is to produce a coating containing a filler on a carbon-carbon composite which will resist peeling and flaking from the surface of the composite.

One broad embodiment of this invention is a method of forming a high temperature oxidation resistant coating on a carbon-carbon composite comprising the steps of:

a) applying a blend of a hydrosilylation catalyst and 1) a cyclosiloxane monomer of formula

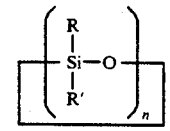

where n is an integer from 3 to about 20, R is hydrogen, and R' is an alkene having from 2 to about 20 carbon atoms and containing a vinyl-silicon bond, or 2) at least two different cyclosiloxane monomers of the same formula as above and with the same n integer value range where R' is an alkyl group of from 1 to about 20 carbon atoms, and in one cyclosiloxane monomer R is hydrogen and in the others R is an alkene of from 2 to about 20 carbon atoms containing a vinyl-silicon bond to a carbon-carbon composite to afford a coated carbon-carbon composite;

(b) curing said coated carbon-carbon composite at curing conditions to produce a cyclosiloxane polymer coated carbon-carbon composite;

(c) pyrolyzing said polymer coated carbon-carbon composite at pyrolyzing conditions to produce a black glass coating on said carbon-carbon composite; and (d) recovering said black glass coated carbon-carbon composite.

A further broad embodiment of this invention comprises a method of forming a high temperature oxidation resistant coating on a carbon-carbon composite comprising the steps:

a) polymerizing a blend of a hydrosilylation catalyst, a filler and 1) a cyclosiloxane monomer of formula

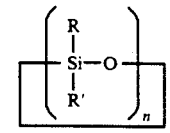

where n is an integer from 3 to about 20, R is hydrogen, and R' is an alkene having from 2 to about 20 carbon atoms and containing a vinyl-silicon bond, or 2) at least two different cyclosiloxane monomers of the same formula as above and with the same n integer value range where R' is an alkyl group of from 1 to about 20 carbon atoms, and in one cyclosiloxane monomer R is hydrogen and in the others R is an alkene of from 2 to about 20 carbon atoms containing a vinyl-silicon bond to produce a black glass precursor polymer containing a filler;

b) pyrolyzing said polymer precursor at pyrolyzing conditions to form a black glass powder containing a filler;

c) reducing the particle size of the filled black glass powder;

d) mixing said reduced particle size black glass with a new portion of the blend of the cyclosiloxane monomers and hydrosilylation catalyst and optionally a filler of step (a) to form a slurry.

e) applying said slurry from step (d) to a carbon-carbon composite;

f) curing said coated carbon-carbon composite at curing conditions to produce a filled cyclosiloxane polymer coated carbon-carbon composite;

g) pyrolyzing said filled polymer coated carbon-carbon composite at pyrolyzing conditions to produce a filled black glass containing coating on said carbon-carbon composite; and h) recovering said filled black glass coated carbon-carbon composite. Additionally, the black glass coated carbon-carbon composite may be impregnated with the liquid mixture of step (a), and pyrolyzed to produce a crack-free filled black glass containing coating on said carbon-carbon composite.

Other objects and embodiments will be found in the following further detailed description of the present invention.

DETAILED DESCRIPTION OF THE INVENTION

This invention is concerned with forming a protective coating on a carbon-carbon composite to prevent oxidation of the composite at temperatures in excess of 400° C. This coating is formed on the carbon-carbon composite by applying a blend containing a cyclosiloxane monomer and containing a hydrosilylation catalyst, curing the coated composite, pyrolyzing the coating to provide a black glass protective coating on the carbon-carbon composite and recovering said coated carbon-carbon composite. Additionally, a filler may be added to said blend to improve the durability of the resultant coating. Minor cracks in this coating are filled in by impregnation with the monomer blend followed by pyrolysis of the new coating to give a macrocrack-free surface.

For the purposes of this application and the appended claims, the following definition of terms will apply:

1) crack-free means that the surface coating shows little or no macrocracks;

2) vinyl-silicon bond means that a carbon with a double bond in an alkene is bound directly to a silicon atom;

3) polymerizing means to make a polymer in a flowable state from the cyclosiloxane monomers;

4) curing refers to the polymerization of a cyclosiloxane monomer to the point that a three-dimensional or a cross-linked polymer is formed and the resultant polymer no longer flows; and 5. a black glass is defined by the empirical formula $SiC_xO_y$ where x ranges from 0.5 to about 2.0 and y ranges from 0.5 to about 3.0.

A typical coating is obtained by dipping a carbon-carbon composite into a mixture of a hydrosilylation catalyst, a cyclosiloxane monomer having a vinyl silicon bond, and a cyclosiloxane monomer having a hydrogen-silicon bond, polymerizing and curing this coating, and then pyrolyzing the cured coating to produce a hard black glass coating on the carbon-carbon composite. In a modification of the above process, the monomeric cyclosiloxane may contain both vinyl silicon and hydrogen-silicon bonds in a single monomer molecule. In addition, the durability of this coating of black glass may be increased by utilizing a monomeric mixture containing a filler such as a dispersed silicon carbide powder to produce a filled black glass coating. If so desired, the monomeric blend containing no filler may be used to apply a protective coating to the carbon-carbon composite.

Cyclosiloxanes are the preferred silicon containing compounds for forming a coating over the carbon-carbon composites.

Examples of cyclosiloxanes include, but are not limited to, 1,3,5,7-tetramethyltetrahydrocyclotetrasiloxane,
1,3,5,7-tetravinyltetrahydrocyclotetrasiloxane,
1,3,5,7-tetravinyltetraethylcyclotetrasiloxane,
1,3,5,7-tetravinyltetramethylcyclotetrasiloxane,
1,3,5-trimethyltrivinylcyclotrisiloxane,
1,3,5-trivinyltrihydrocyclotrisiloxane,
1,3,5-trimethyltrihydrocyclotrisiloxane,
1,3,5,7,9-pentavinylpentahydrocyclopentasiloxane,
1,3,5,7,9-pentavinylpentamethylcyclopentasiloxane,
1,1,3,3,5,5,7,7-octavinylcyclotetrasiloxane,
1,1,3,3,5,5,7,7-octahydrocyclotetrasiloxane,
1,3,5,7,9,11-hexavinylhexamethylcyclohexasiloxane,
1,3,5,7,9,11-hexamethylhexahydrocyclohexasiloxane,
1,3,5,7,9,11,13,15,17,19-decavinyldecahydrocyclodecasiloxane,
1,3,5,7,9,11,13,15,17,19,21,23,25,27,29-pentadecavinylpentadecahydrocyclopentadecasiloxane,
1,3,5,7-tetrapropenyltetrahydrocyclotetrasiloxane,
1,3,5,7-tetrapentenyltetrapentylcyclotetrasiloxane and
1,3,5,7,9-pentadecenylpentapropylcyclopentasiloxane.

The polymerization reaction is carried out in the presence of a hydrosilylation catalyst. The hydrosilylation catalyst can be chosen from those catalysts that are well known in the art. Well known catalysts are, for example, nickel carbonyl, iron carbonyl, cobalt carbonyl, manganese carbonyl, the platinum catalysts (metallic platinum or platinum compounds) and the rhodium catalysts. Of these catalysts, the platinum catalysts are particularly preferred. The platinum compounds that are catalytically active for polymerizing a cyclosiloxane include but are not limited to chloroplatinic acid, platinum divinyltetramethyldisiloxane, platinum carbonyl dichloride, and tris(triphenylphosphine)platinum. The catalyst can be added either in a heterogeneous or homogeneous phase, although not with equivalent results. A homogeneous catalyst is preferred. The catalyst is present in amounts ranging from about 1 ppm to about 200 ppm of the metal in the monomeric blend.

Application of the cyclosiloxane monomer plus hydrosilylation catalyst blend to the carbon-carbon composite can be effected by any method known in the art. These methods include dipping the composite into the blend, spraying the blend onto the composite or brushing the blend onto the composite. These methods of application can be used for any of the blends described herein.

Although application of any of the blends described in this invention can be done at atmospheric pressures, it is preferred to apply the desired blend to the carbon-carbon composite at reduced pressures. Reduced pressures in the range of about 1 mm Hg to about 29 mm Hg are preferred for the application step. The advantage to using reduced pressures during the application step is that considerably fewer macrocracks are produced after pyrolysis of the coating. The time required to effect the application can range from about 1 minute to about 60 minutes.

The curing and polymerization take place at a temperature range of from about 25° C. to about 300° C. The amount of time required to effect the polymerization and curing ranges from about one minute to about 600 minutes with the longer amounts of time required at the lower temperatures. Curing is effected by simply extending the amount of time at the desired temperature. While the polymerizing and curing steps of this invention can be performed at atmospheric pressure, a better product is formed if the polymerization and curing steps are done under pressure. By doing the polymerization and curing steps under pressure, nucleated bubbling is prevented which would otherwise leave cracks and voids in the polymer coating. Pressures in the range from about 14 psi to about 30,000 psi can be used to prevent nucleated bubbling.

The pyrolysis step of this invention consists of heating the polymer coated composite in a non-oxidizing gas atmosphere to a temperature in the range of from about 700° C. to about 1400° C. for a time in the range of from about 1 hour to about 300 hours, and at a pressure in the range of from about 14 psi to about 30,000 psi to form the black glass coating of the instant invention. Examples of non-oxidizing gases include but are not limited to nitrogen and argon.

It is contemplated as within the scope of this invention to repeat the above steps to build up a layered coating on the carbon-carbon composite. The protective coating can be build-up by so that it makes up no more than 5 percent of the total weight of the composite. Additionally, by applying the coating in multiple layers, any macrocracks which are formed during the pyrolysis of the first layer are filled in by fresh blend during application of a subsequent layer and are thus eliminated. Thus, a macrocrack-free protective coating is formed by applying the coating in several layers.

While the cyclosiloxane monomeric blend can be used by itself to form a coating on the carbon-carbon composite, it is preferable to add a filler to the cyclosiloxane monomeric blend in order to improve the durability of the resultant coating formed on the carbon-carbon composite. The filler may be dispersed in the monomeric cyclosiloxane blend by any dispersion method known in the art including but not limited to ultrasonic dispersion. This filler containing blend may be used to form a coating over the carbon-carbon composite as described above.

Alternatively, the filler containing monomeric cyclosiloxane blend can be polymerized and pyrolyzed to form a black glass powder which contains a filler (hereinafter filled black glass). This method results in an even distribution of the filler in the black glass. The particle size of this black glass powder containing filler can be reduced to an average particle diameter of about 5 to about 10 microns. Any conventional size reduction methods such as ball milling or jet milling may be used. This finely ground powder can be dispersed in a fresh cyclosiloxane monomeric blend to give a slurry. This slurry can be applied to a carbon-carbon composite to form a protective coating with improved durability and adherence versus a coating that does not contain a filled black glass.

Examples of fillers include, but are not limited to, silicon carbide, silicon nitride, titania, hafnia, zirconia, silica, alumina and mixtures thereof. These fillers can be present in the form of powders, whiskers or fibers. The best results are achieved when the filler is powdered silicon carbide which is dispersed in a cyclosiloxane monomeric blend by such means as ultrasonic dispersal, and which forms a black glass containing from about 20% to about 70% by weight silicon carbide. This filled black glass powder is milled to give particles with an average particle diameter of about 7 microns and dispersed in a fresh batch of cyclosiloxane monomer blend to form a slurry which is used to coat a composite and pyrolyzed to give a filled black glass coating containing from about 15% to about 65% by weight silicon carbide and from about 85% to about 35% by weight black glass on the carbon-carbon composite. A lesser quality coating is achieved when the silicon carbide is directly dispersed in the monomeric cyclosiloxane blend and then applied to the composite. It is also contemplated as within the scope of this invention to disperse the filled black glass in a cyclosiloxane monomeric blend containing a filler as well as a cyclosiloxane monomeric blend containing no filler. The filler, if any, used in the monomeric blend, in which the filled black glass is dispersed, may be different from or identical to the filler used in the black glass and can be present in the monomeric blend in a range of from about 20 to about 70%.

The following examples are given for illustrative purposes only. It is to be understood that these examples are not intended as an undue limitation on the broad scope of the invention as set forth in the appended claims.

EXAMPLE I

A monomeric siloxane blend was produced by blending 7.2 grams of methylhydrocyclosiloxane which is a mixture of cyclotrimer, cyclotetramer, cyclopentamer, and cyclohexamer, with 10.0 grams of 1,3,5,7-tetravinyltetramethyl-cyclotetrasiloxane in the presence of 0.05 ml of 3% platinum-divinyltetramethyldisiloxane complex in xylene (this monomeric siloxane solution will be hereinafter referred to as solution A). 14.3 grams of powdered silicon carbide filler were ultrasonically dispersed in this blend followed by polymerization for 90 minutes at a temperature of 55° C. to produce a polymer containing silicon carbide which was subsequently pyrolyzed in a nitrogen atmosphere at a heating rate of 200° C. per hour to 1200° C. to afford a black glass containing silicon carbide. The resultant black glass/silicon carbide was then reduced in size to an average particle diameter of about 7 microns by ball milling. The black glass/silicon carbide powder contained about 50% silicon carbide, as calculated from the stoichiometry of the reaction.

EXAMPLE II

A monomeric cyclosiloxane blend identical to solution A was prepared and to this blend was added the black glass/silicon carbide powder of Example I. The powder, present in 50% by weight, was slurried into the monomeric cyclosiloxane blend utilizing an ultrasonic dispersion method (solution B). A carbon-carbon composite was dipped into the slurry described above and the coated carbon-carbon composite was cured at 60° C. for about thirty minutes to transform the reinforced monomeric mixture into a polymer coating on the composite. The polymer coated composite was then placed under flowing nitrogen in a 1200° C. furnace for about 1 hour to produce a carbon-carbon composite coated with black glass containing silicon carbide.

In order to seal any cracks which may have developed during pyrolysis of the coated composite, the black glass coated composite was placed under vacuum and was impregnated with solution A. Subsequent pyrolysis produced a black glass coating with fewer macrocracks than found prior to impregnation. No macrocracks were induced by heating the coated composite to 1400° C. in argon with subsequent slow cooling.

EXAMPLE III

A black glass containing silicon carbide coated carbon-carbon composite weighing 7.42 grams was heated in a vertical furnace in air at a rate of 200° C. per hour up to 950° C. After eight hours at 950° C., the sample was cooled to room temperature at a rate of 200° C. per hour. The specimen retained 75% of its weight after undergoing this oxidation test. Observation of the thermogravimetric analysis thermogram indicated that the weight loss occurred primarily during the ramp to 950° C. at 200° C. per hour. The coating consisted of 73% by weight black glass coating and 27% by weight silicon carbide in the coating.

EXAMPLE IV

This example is included to describe the result when an unfilled black glass, made from a cyclosiloxane monomer, was slurried with a monomeric cyclosiloxane similar to the solution A blend prepared as in Example I. This unfilled black glass slurry was utilized in place of the silicon carbide filled black glass slurry.

An unfilled mixture made by adding 7.2 grams of methylhydrocyclosiloxane to 10.0 grams of 1,3,5,7-tetravinyltetramethycyclotetrasiloxane in the presence of 90 ppm platinum (the platinum is present in the same form as in Example I) was polymerized at 55° C. for 80 minutes and subsequently pyrolyzed at 1200° C. under argon to provide an unfilled black glass. The black glass so produced was reduced to a powder by ball milling and then added to a new portion of the unfilled monomeric cyclosiloxane blend to produce a slurry which was applied to a carbon-carbon composite. Each item was infiltrated with Solution A. The infiltration step was performed in one case at atmospheric pressure and in a second case under a vacuum of 29 mm of mercury. Each item was pyrolyzed at 1200° C. as in Example I to give a black glass coated composite. Each coated composite was then heated at 1200° C. in air for about 3 hours and each composite lost about 80% of its initial weight thus showing that less effective protection is afforded by black glass alone.

For comparison, a coated composite made using the procedure of Example II was heated in air at 1200° C. for about 3 hours and showed a weight loss of 23% after the oxidation test. An uncoated carbon-carbon composite was completely burned out in an identical test.

EXAMPLE V

This example is included in order to point out the difference in quality of the black glass coating produced by substituting pure silicon carbide for the black glass containing silicon carbide of Example I. To a new solution A prepared as in Example I was added 50% silicon carbide powder to form a slurry. A carbon-carbon composite was coated with this slurry and the coating was cured in a 60° C. oven for 60 minutes, and subsequently pyrolyzed under argon at 1200° C. for 1 hour. The coating cracked and flaked off. When silicon carbide whiskers were substituted for the silicon carbide powder, a better coating was produced, but neither coating was as good as that in Example II above.

I claim as my invention:

1. A method of forming a high temperature oxidation resistant coating on a carbon-carbon composite comprising the steps:

(a) polymerizing a blend of a hydrosilylation catalyst, a filler and 1) a cyclosiloxane monomer of formula

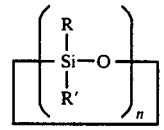

where n is an integer from 3 to about 20, R is hydrogen, and R' is an alkene having from 2 to about 20 carbon atoms and containing a vinyl-silicon bond, or 2) at least two different cyclosiloxane monomers of the same formula as above and with the same n integer value range where R' is an alkyl group of from 1 to about 20 carbon atoms and in one cyclosiloxane monomer R is hydrogen, and in the others R is an alkene of from 2 to about 20 carbon atoms containing a vinyl-silicon bond to produce a black glass precursor polymer containing a filler;

(b) pyrolyzing said polymer precursor under a non-oxidizing gas atmosphere and at a temperature of about 700° C. to about 1400° C. for a time sufficient to form a black glass powder containing a filler;

(c) reducing the particle size of the filled black glass powder;

(d) mixing said reduced particle size black glass with a new portion of the blend of the cyclosiloxane monomers and hydrosilylation catalyst and optionally a filler of step (a) to form a slurry;

(e) applying said slurry from step (d) to a carbon-carbon composite;

(f) curing said coated carbon-carbon composite at curing conditions to produce a cyclosiloxane polymer coated carbon-carbon composite;

(g) pyrolyzing said filled polymer coated carbon-carbon composite under a non-oxidizing gas atmosphere and at a temperature of about 700° C. to about 1400° C. for a time sufficient to produce a filled black glass containing coating on said carbon-carbon composite; and (h) recovering said filled black glass coated carbon-carbon composite.

2. The process of claim 1 where said filled black glass coated carbon-carbon composite is further impregnated with the blend of step (a), and pyrolyzed as in claim 1 to produce a crack-free filled black glass coating on said carbon-carbon composite and recovering said filled black glass coated carbon-carbon composite.

3. The process of claim 1 where said filler is selected from the group consisting of silicon carbide, silicon nitride, titania, hafnia, zirconia, silica, alumina and mixtures thereof.

4. The process of claim 3 where the filler is a powder, whisker, or a fiber.

5. The process of claim 3 where said black glass containing filler has an amount of filler present in the range of from about 20% to about 70% in step (b) of claim 1 and said coating has an amount of filler in the range of from 15% to about 65% in said coated composite.

6. The process of claim 2 where said impregnation is applied under a reduced pressure in the range from about 1 mm Hg to about 29 mm Hg and for a time in the range of 1 minute to 60 minutes.

7. The process of claim 1 where said polymerization takes place at a temperature in the range of from about 25° C. to about 300° C., a pressure in the range of from about 14 psi to about 30,000 psi, and a time in the range of from about 1 minute to about 600 minutes.

8. The process of claim 1 where said filled black glass is present in said monomer mixture of step (d) at from about 20% to about 70%.

9. The process of claim 1 where said coating comprises an amount of black glass in the range of from about 35% to about 85%.

10. The process of claim 1 where said curing conditions include a temperature in the range of from about 25° C. to about 300° C., for a time in the range of from about 1 minute to about 600 minutes and at a pressure in the range of from about 14 psi to about 30,000 psi.

11. The process of claim 1 further characterized in that said cyclosiloxane monomer is 1,3,5,7-tetravinyltetramethylcyclotetrasiloxane.

12. The process of claim 1 further characterized in that said cyclosiloxane monomer is 1,3,5,7-tetrahydrotetramethylcyclotetrasiloxane.

13. The process of claim 1 further characterized in that said cyclosiloxane monomer is 1,3,5,7-tetravinyltetrahydrocyclotetrasiloxane.

14. The process of claim 1 further characterized in that said cyclosiloxane monomer is 1,3,5-trivinyltrimethylcyclotrisiloxane.

15. The process of claim 1 further characterized in that said cyclosiloxane monomer is 1,3,5-trimethyltrihydrocyclotrisiloxane.

16. The process of claim 1 further characterized in that said hydrosilylation catalyst is a metal compound where said metal is selected from the group consisting of platinum, cobalt and manganese and is present in an amount ranging from about 1 ppm to about 200 ppm as the metal.

17. The product of the process of claim 1.

18. A method of forming a high temperature oxidation resistant coating on a carbon-carbon composite comprising the steps:

(a) applying a blend of a hydrosilylation catalyst and
1) a cyclosiloxane monomer of formula

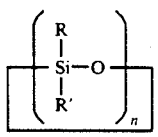

where n is an integer from 3 to about 20, R is hydrogen, and R' is an alkene having from 2 to about 20 carbon atoms and containing a vinyl-silicon bond, or 2) at least two different cyclosiloxane monomers of the same formula as above and with the same n integer value range where R' is an alkyl group of from 1 to about 20 carbon atoms and in one cyclosiloxane monomer R is hydrogen, and in the others R is an alkene of from 2 to about 20 carbon atoms containing a vinyl-silicon bond to a carbon-carbon composite to afford a coated carbon-carbon composite;

(b) curing said coated carbon-carbon composite at curing conditions to produce a cyclosiloxane polymer coated carbon-carbon composite;

(c) pyrolyzing said polymer coated carbon-carbon composite under a non-oxidizing gas atmosphere and at a temperature of about 700° C. to about 1400° C. for a time sufficient to produce a black glass coating on said carbon-carbon composite; and (d) recovering said black glass coated carbon-carbon composite.

19. The process of claim 18 further characterized in that said curing conditions include a temperature in the range of from about 25° C. to about 300° C., a pressure in the range of from about 14 psi to about 30,000 psi, and a time in the range of from about 1 minute to about 600 minutes.

20. The process of claim 18 further characterized in that said cyclosiloxane monomer is 1,3,5-trivinyltrimethylcyclotrisiloxane.

21. The process of claim 18 further characterized in that said cyclosiloxane monomer is 1,3,5,7-tetravinyltetramethylcyclotetrasiloxane.

22. The process of claim 18 further characterized in that cyclosiloxane monomer is 1,3,5,7-tetrahydrotetramethylcyclotetrasiloxane.

23. The process of claim 18 further characterized in that said cyclosiloxane monomer is 1,3,5,7-tetravinyltetrahydrocyclotetrasiloxane.

24. The process of claim 18 further characterized in that said hydrosilylation catalyst is a metal compound where said metal is selected from the group consisting of platinum, cobalt and manganese and is present in an amount ranging from about 1 ppm to about 200 ppm as the metal.

25. The product of the process of claim 18.

26. A coated carbon-carbon composite comprising not less than 95% by weight of a carbon-carbon composite which has been coated with a filled black glass where said black glass has the composition $SiC_xO_y$ in which x ranges from about 0.5 to about 2.0, y ranges from about 0.5 to about 3.0, and where the coating contains from about 15% to about 65% weight percent of a filler.

27. The coated composite of claim 26 further characterized in that the filled black glass contains a filler selected from the group consisting of silicon carbide, silicon nitride, titania, hafnia, zirconia, silica, alumina and mixtures thereof.

28. The coated composite of claim 26 where said filler is a powder, fiber, or a whisker.

* * * * *